(12) United States Patent
Ram et al.

(10) Patent No.: US 8,804,878 B2
(45) Date of Patent: Aug. 12, 2014

(54) FAST ACQUISITION OF FRAME TIMING AND FREQUENCY

(71) Applicant: Gilat Satellite Networks Ltd., Petah-Tikva (IL)

(72) Inventors: Uzi Ram, Givat Elah (IL); Michael Levitsky, Petah Tikva (IL); Oded Bialer, Petah Tikva (IL); Guy Levitas, Rosh Ha'ain (IL)

(73) Assignee: Gilat Satellite Networks Ltd., Petah-Tikva (IL)

( * ) Notice: Subject to any disclaimer, the term of this patent is extended or adjusted under 35 U.S.C. 154(b) by 0 days.

(21) Appl. No.: 13/668,788

(22) Filed: Nov. 5, 2012

(65) Prior Publication Data

US 2013/0177061 A1    Jul. 11, 2013

Related U.S. Application Data

(60) Provisional application No. 61/585,389, filed on Jan. 11, 2012.

(51) Int. Cl.
*H04L 27/06* (2006.01)

(52) U.S. Cl.
USPC ..... 375/340; 375/344; 455/182.1; 455/182.2; 455/192.1; 455/192.2

(58) Field of Classification Search
USPC ............ 375/324, 340, 344; 455/182.1–181.2, 455/191.1–191.2
See application file for complete search history.

(56) References Cited

U.S. PATENT DOCUMENTS

2006/0239368 A1\* 10/2006 Hwang et al. ................. 375/260
2010/0275239 A1\* 10/2010 Kim et al. ..................... 725/131

\* cited by examiner

*Primary Examiner* — Curtis Odom
(74) *Attorney, Agent, or Firm* — Banner & Witcoff, Ltd.

(57) ABSTRACT

Modern digital signals include framing. A known sequence of transmission symbols (Unique Word (UW)) included in the transmitted signal may be used by a receiver for framing synchronization. A receiver configured to receive such a signal may be configured to detect the UW even when the signal is received with some frequency uncertainty (e.g. offset or error). A method is presented for fast acquisition of symbol and/or frame timing of a signal, including in the presence of frequency uncertainty. In some embodiments, the presented method may be used for determining a frequency offset of the received signal and a location of a unique word (UW) within a frame of the received signal, wherein said determining is based on a two-dimensional search map.

23 Claims, 4 Drawing Sheets

FAST ACQUISITION OF FRAME TIMING AND FREQUENCY

CROSS-REFERENCE TO RELATED APPLICATIONS

This application claims priority to U.S. Provisional Application Ser. No. 61/585,389, filed Jan. 11, 2012, and entitled "Fast Acquisition of Frame Timing and Frequency," which is hereby incorporated by reference in its entirety as an example embodiment.

FIELD OF THE INVENTION

Aspects of the disclosure pertain to the general field of communication modems. Aspects of the disclosure pertain to communication modems for wireless communication and satellite communication.

BACKGROUND

Modern digital signals, for example over satellite links, may include some kind of framing. Framing may be needed, for instance, in order to determine an end of one code word (e.g. a data frame) and a start of a next code word (e.g. a next data frame) within the transmission. A known sequence of transmission symbols, which may be sometimes referred to as Unique Word (UW), may be used for framing synchronization. For example, in burst transmissions, a single UW (e.g. at the beginning of the burst) may be used for synchronizing the burst framing. In another example, in continuous transmission, a UW sequence may be occasionally transmitted, though for simplifying synchronization UW instances may be periodically transmitted, e.g. at constant intervals or distances (for example measured in symbols).

A UW sequence may be detected using a coherent correlator. The correlator may rotate the known symbols of the UW "backwards", so that all the UW symbols may be added coherently (i.e. in phase). In some examples, if the phase of the received signal is unknown, an amplitude detector or a power detector may be used at the output of the correlator for detecting the UW existence. However, if a transmitted signal is received at some frequency offset, the UW symbols may be undesirably rotated while being added by a correlator (i.e. due to the frequency offset), causing the said addition of symbols to be at least somewhat incoherent. Thus, this undesired rotation may introduce degradation to the coherent detection, and in severe cases it may prevent detection of the UW. For example, if the transmission symbol rate is denoted as Rs, the UW length in symbols is denoted as L, and the frequency error is denoted as $\Delta F$, a degradation in detection performance (in dB) may be calculated as:

$$20 \, LOG(SINC(L*\Delta F/Rs))$$

wherein LOG is the decimal logarithm function and SINC is the normalized SINC function, defined as:

$$SINC(X)=SIN(\pi X)/\pi X$$

wherein SIN is the known trigonometric sinus function.

For example, at a frequency offset of Rs/(4 L), the resulting degradation in detection performance might be in the excess of 1 dB. In another example, at a frequency offset of Rs/L, detection might be entirely impossible (e.g. as $\Delta F$ aims to Rs/L, the expression SINC(L*$\Delta F$/Rs) aims to 0 and the expression 20 LOG(SINC(L*$\Delta F$/Rs)) aims to minus infinity, i.e. the degradation at such a frequency offset might exceed the detector capabilities).

Therefore, when trying to determine reception timing of a UW in presence of a relatively large frequency error, a receiver may use one or more techniques in order to enable detection of the UW. One technique is to determine the frequency offset through frequency scanning The receiver may be set to receive the signal at a certain frequency and to try locating the UW. If the UW is not detected, the receiver frequency may be modified to a close neighbor frequency within a preconfigured frequency offset range, where the receiver may try again to locate the UW, and so on until the UW is located or the entire preconfigured frequency offset range may be scanned. However, this scanning method may significantly increase the acquisition time (e.g. the time it may take to synchronize or to lock the receiver on the received signal). It may be noted that if a frequency step size is in the order of Rs/2 L, the residual maximal frequency error is Rs/4 L, hence ensuring up to 1 dB degradation in detection performance. However, selecting a frequency step size in the order of Rs/2 L may imply a relatively large number of frequency steps (e.g. scanning iterations) that may be required before a correct frequency offset may be found.

An alternative method to deal with frequency offset may be to divide the UW correlator into short segments, i.e. to perform the correlation in parts, so that any exiting frequency offset may result in smaller loss of coherency within each segment. The correlation results of all segments may then be further assembled in a non-coherent manner. For example, the amplitude-square of each segment correlation output may be computed and the results from all segments may be then combined. However, a disadvantage of this method may be its use of non-linear operation (e.g. such as squaring) before all fragment contributions may be added. This non-linear operation may introduce another source of detection-loss, often denoted as "Squaring Loss" that may become quite significant, for example in negative SNR (Signal to Noise Ratio) scenarios. The SNR at an output of a short-segment correlation of length m ($SNR_{segment\_out}$) may be represented as:

$$SNR_{segment\_out}=SNR_{in}+10 \, LOG(m)$$

wherein $SNR_{in}$ is the SNR of the signal at the input to the correlation. If $SNR_{in}$ is low and the segment length (m) is short, $SNR_{segment\_out}$ may still be low. For example, considering $SNR_{in}=-15$ dB, UW length L=64, and short segment correlation length m=4. In such example:

$$SNR_{segment\_out}=SNR_{in}+10 \, LOG(M)=-15+10 \, LOG(4)=-9 \, dB$$

$$SNR_{full\_correlation\_out}=SNR_{segment\_out}-Squaring\_Loss+10 \, LOG(L/m)$$

The squaring loss may be significantly increased as $SNR_{segment\_out}$ becomes more negative (e.g. Squaring_Loss≈$SNR_{segment\_out}$ for negative $SNR_{segment\_out}$ values and at least 3 dB for positive or high $SNR_{segment\_out}$ values). Thus, considering the above example:

$$SNR_{full\_correlation\_out}=-9-9+10 \, LOG(64/4)=-9-9+12=-6 \, dB$$

However, if the frequency offset is negligible, a full correlation may be calculated without segmentation. In such case:

$$SNR_{full\_correlation\_out}=SNR_{in}+10 \, LOG(L)=-15+10 \, LOG(64)=-15+18=3 \, dB$$

Thus, a more efficient technique for synchronizing to a signal framing under a significant frequency offset error may be useful. Such a technique should be fast on one hand and resulting in no or little degradation to detection performance on the other hand.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below.

Aspects of the disclosure are directed to a method for fast acquisition of symbol and/or frame timing of a signal, which may be received with frequency uncertainty. In some embodiments, the method may include steps of Unique Word (UW) modulation elimination, optional partial coherent addition and Fourier Transform (FT) processing, and a two-dimensional search of UW timing and/or of frequency offset. Such method may be useful for speeding timing acquisition of a framed signal, including in the presence of a frequency uncertainty or offset.

Aspects of the disclosure are directed to a receiver, which may be configured to use an algorithm for acquiring frame timing (e.g. UW location within a frame) in presence of frequency uncertainty. In some embodiments, the algorithm may be implemented using a Field Programmable Gate Array (FPGA).

BRIEF DESCRIPTION OF THE DRAWINGS

Figure 1:
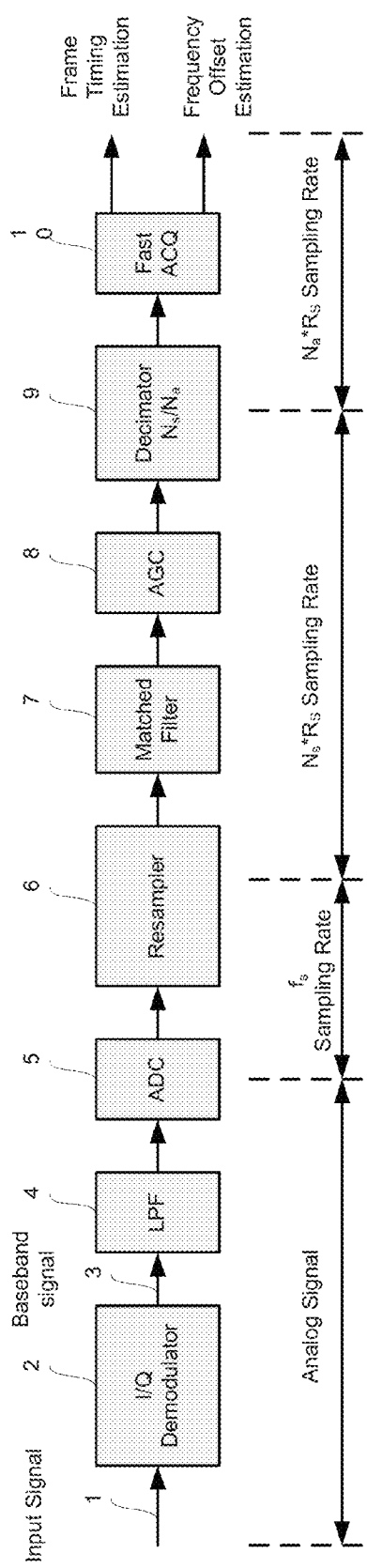

Having thus described the disclosure in general terms, reference will now be made to the accompanying drawings, which are not necessarily drawn to scale, and wherein:

FIG. 1 shows a block diagram of a demodulation path in accordance with aspects of the disclosure.

Figure 2:
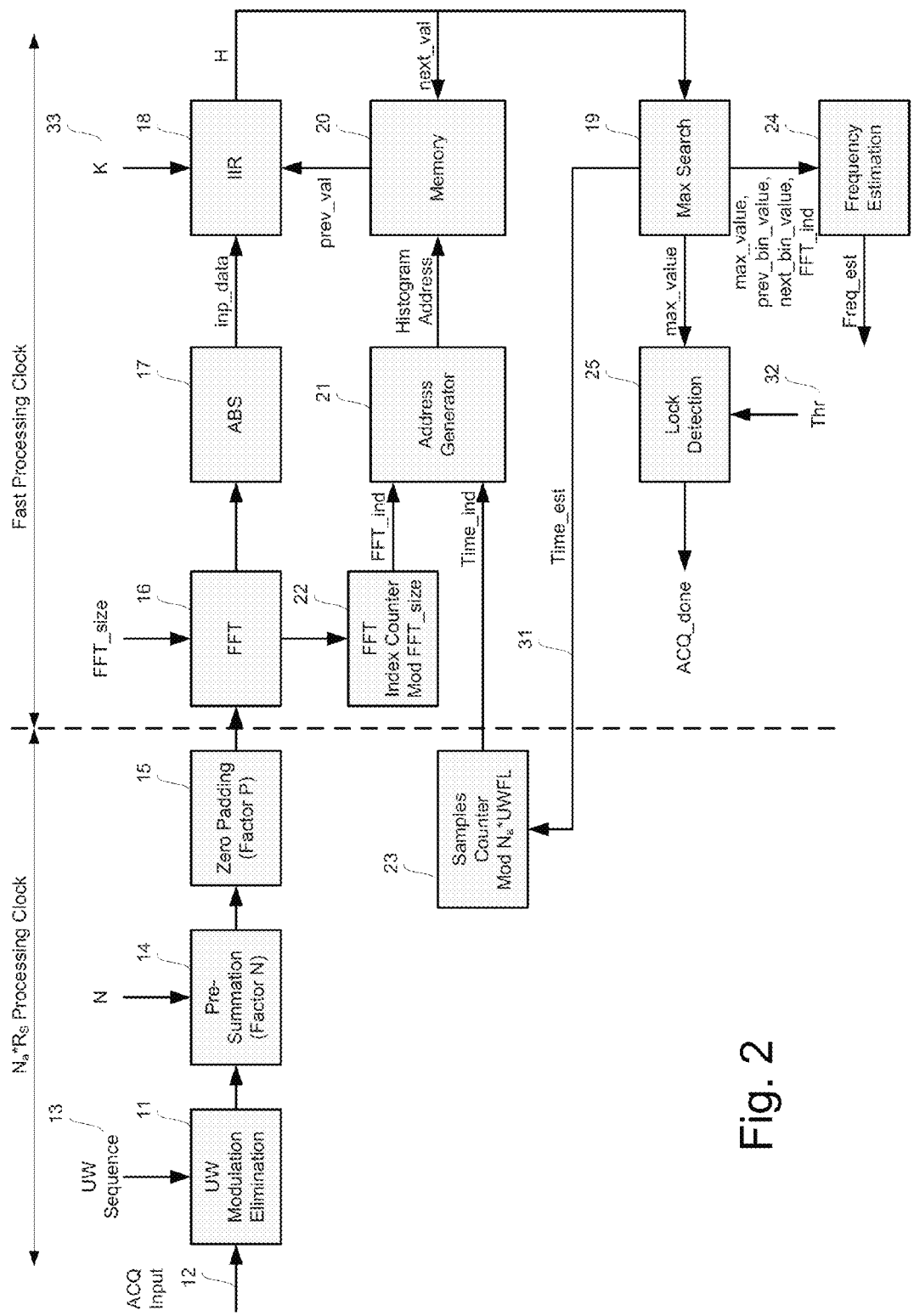

FIG. 2 shows a block diagram of a fast acquisition function in accordance with aspects of the disclosure.

Figure 3:
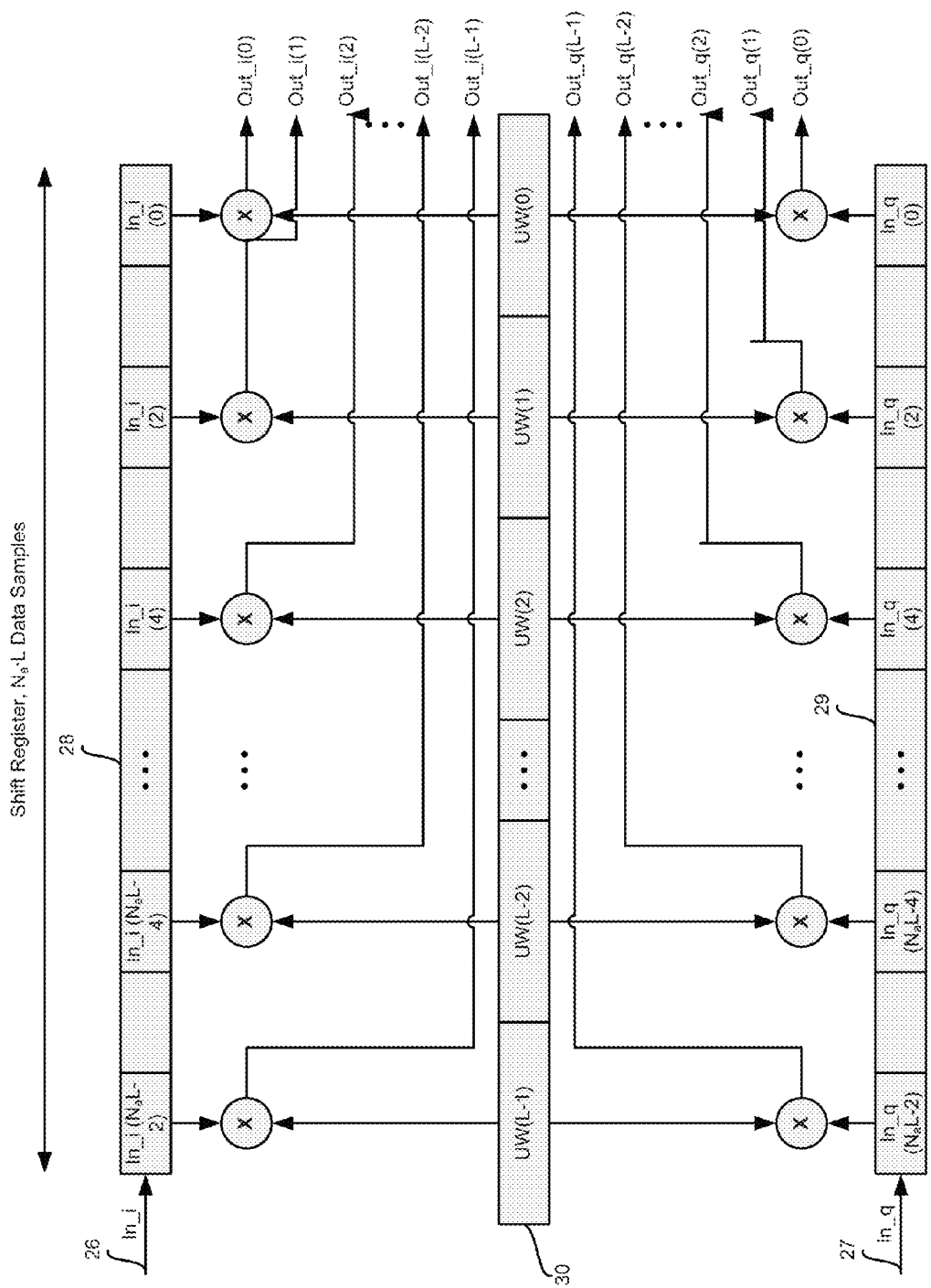

FIG. 3 shows a diagram of unique-word pattern elimination functionality in accordance with aspects of the disclosure.

Figure 4:
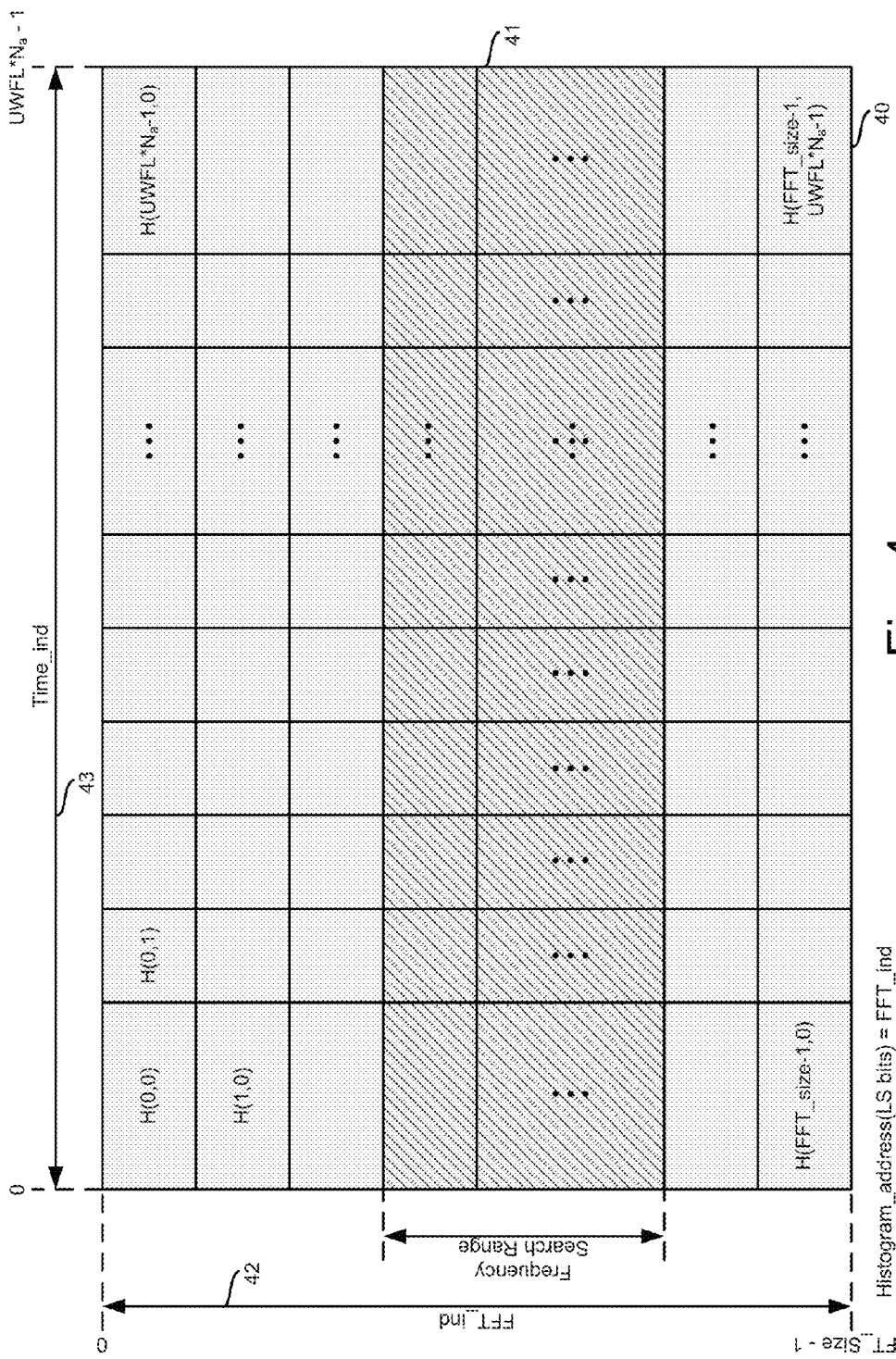

FIG. 4 shows an example representation of a two-dimensional search map in accordance with aspects of the disclosure.

DETAILED DESCRIPTION

A receiver may be configured to receive a signal at a given frequency and to synchronize with a framing property of the received signal, wherein framing may be marked by a predefined sequence of symbols, known as Unique Word (UW). For the purpose of simplifying the disclosure description and for maintaining coherency of the examples given, let L represent the length in symbols of a UW (for example, L=64) and let UWFL represent the length in symbols of a UW frame, i.e. the distance between adjacent UW instances, (for example UWFL=2000). Given the above terminology, the methods disclosed herein may be directed at detecting the UW sequence (or pattern) within the UW frame, while there may be UWFL possible timings (i.e. locations on a time axis with a symbol period grid) and wherein said detection may be influenced by receiving the signal with a frequency uncertainty or at some frequency offset.

Furthermore, for the sake of simplicity, reference may be made herein to use of the Fast Fourier Transform (FFT) algorithm for computing a Fourier Transform (FT). However, any other method or algorithm for computing a Fourier Transform (FT) may be used without leaving the scope of this disclosure and without changing any of its aspects.

FIG. 1 shows an example of elements that may be included in a reception flow of a signal, in accordance with aspects of the disclosure. A signal (1) (e.g. in Intermediate Frequency (IF)) may be presented at the input of I/Q Demodulator (2), which may be configured to convert the signal to a baseband complex signal (3). Baseband signal (3) may be then presented at the input of an antialiasing low pass filter (LPF) (4) which may be configured to filter the baseband signal before it may be sampled by analog to digital converter (ADC) (5), wherein said sampling may transform the received signal to a digital complex representation. In some embodiments, said sampling may be performed using sampling frequency $f_s$.

The digital signal present at the output of ADC (5), may be presented at the input of re-sampler (6), which may be configured to resample the signal in accordance with at least a symbol rate property of the received signal (Rs), for example in order to provide Ns samples per symbol (wherein Ns>1 may be useful since an optimal sampling timing of a symbol may be initially unknown). In some embodiments, re-sampler (6) may be configured to output the resampled signal using a sampling rate of 4Rs (where Rs is the signal's symbol rate), hence providing 4 samples per each symbol (i.e. Ns=4). The resampled complex sample stream, at a sampling rate of Ns*Rs, may be presented at the input of matched filter (7), which may be configured to maximize the signal to noise ratio (SNR) and to provide its output signal at the same sampling rate as its input signal (e.g. Ns*Rs). The output signal of matched filter (7) may be presented at the input of automatic gain control (AGC) block (8), which may be configured to adjust the amplitude of the signal for at least the purpose of providing a signal having a predefined level at the input of fast acquisition block (Fast ACQ) (10). In some embodiments, fast acquisition block (10) may be configured to process the signal at a sampling rate of Na*Rs (for example, Na=2), thus an additional decimation block (9) of factor Ns/Na may be used before fast acquisition block (10) (for example, where Ns=4 and Na=2, a decimation factor of 2 may be used).

In some embodiments, re-sampler (6), matched filter (7), AGC block (8), decimation block (9) and fast acquisitions block (10) may be implemented in a Field Programmable Gate Array (FPGA). However, other embodiments in which the above functions may be implemented either in hardware, firmware, software, any mix of hardware, firmware and software, or any other means for implementing such functions, may also be possible and are therefore envisaged by this disclosure.

FIG. 2 shows an example block diagram of fast acquisition block (10) of FIG. 1. Samples, at rate of Na samples per symbol (12) may be presented at the input to the fast acquisition block and provided to UW modulation elimination block (11), an example description of which may be presented in FIG. 3. The complex input signal samples, sampled at Na*Rs (12), may be fed into two shift registers of length Na*L (e.g. shift register 28 for the I component and shift register 29 for the Q component). The samples may be backward rotated in accordance with the UW pattern (13 in FIG. 2), wherein backward rotation may be performed by multiplying the input samples by an inversed pattern of the UW, as shown in FIG. 3. In some embodiments, where the UW may be transmitted as a binary sequence, for example using BPSK modulation, elimination of the UW pattern may require multiplying the I and Q components (26 and 27 respectively) of the input signal by UW pattern (30) (for example, by 1 for a "1" bit and by −1 for a "0" bit). UW modulation elimination block (11) may be configured to present at its output a vector of L samples (elements) in length (i.e. the UW length), each sampled at Rs, every 1/(Na*Rs) time period. These vectors may represent un-modulated samples at intervals of 1/Rs.

In parallel to processing the input samples, fast acquisition block (10) may be configured to include a samples counter (23), which may be configured to count the samples vectors coming out of UW modulation elimination block (11) (e.g. in accordance with a clock at a rate of Na*Rs) and associate each samples vector with an index. Samples counter (23) may be configured with modulo of Na*UWFL, hence each samples vector may have an initial arbitrary index within a UW frame (i.e. between 0 and Na*UWFL-1). Following the above example, where Na=2 and UWFL=2000, samples counter 23 may be configured with modulo of 4000 (i.e. the count value may be ranging from 0 to 3999).

In some aspects of the disclosure, a method is presented for synchronizing samples counter (23) to a first symbol of a UW, so that sample counter (23) may show a predefined count value (for example, 0) at the same time that said first symbol of a UW may be valid at the input of fast acquisitions block (10).

Referring again to FIG. 2, the output vectors of UW modulation elimination block (11) may optionally be passed through pre-summation block (14), having a configurable summation factor N. Pre-summation block (14) may optionally decimate groups of N adjacent samples by summing each group of N samples to form a single sample, at least for the purpose of reducing an input vector size of L samples to an output vector size of L/N samples. In one examples, wherein the signal may be received at a relatively large frequency offset, pre-summation block (14) may be bypassed (i.e. N=1, at least in order to avoid loss of SNR that may result from coherent addition of neighbor symbols). In another example, wherein a UW length may be L=64, pre-summation with a factor being a power of 2 (e.g. 2, 4, 8, 16, etc.) may be used. An output vector of pre-summation (14), of length L/N, may be presented at the input of FFT (Fast Fourier Transform) module (16). Thus, the summation factor N may define the size of the FFT input and output vectors (FFT_size) and in some embodiments as described above it may reduce the vector size. Though reducing the FFT vector size may result in reducing the number of coefficients in the FFT input and output vectors, detection resolution may remain unchanged since said pre-summation also reduces the effective sampling rate by the same ratio. In order to improve detection performance and the FFT grid resolution, the FFT vector size may be enlarged using time domain zero padding (15), thus providing at least a finer frequency resolution. In some embodiments, an FFT vector may be P*(L/N) samples long, i.e. (L/N)*(P-1) zeroes may be added to the L/N pre-summation samples (for example, a zero padding factor P=2 may be used).

FFT module (16) may be configured to compute a Fast Fourier Transform (FFT) of an input vector of a configurable size (e.g. FFT_size) and to output the transformed vector towards ABS block (17), as described further herein. FFT module (16) may be further configured to generate a second output, which may be used for driving FFT index counter (22), wherein FFT index counter (22) may be configured to count FFT output vector samples (i.e. FFT index counter may be configured with modulo of FFT_size). In some embodiments, FFT module (16) may have one output which may be used both for providing transformed vectors to ABS block (17) and for driving FFT index counter (22). In some embodiments, the output of FFT index counter (22) (i.e. its count value) may be used for providing at least a frequency axis index (FFT_ind) to address generation module (21). In addition, each FFT input/output vector may be already indexed using samples counter (23) (i.e. using the corresponding sample index for the FFT input vector), wherein samples counter (23) may be configured with modulo of Na*UWFL, as previously described. In some embodiments, said the output of samples counter (23) (i.e. its count value) may be used for providing at least a time axis index (Time_ind) to address generation module (21).

A summation operation may reduce an equivalent sampling rate of a signal presented at FFT module (16) input, for example to Rs/N, wherein Rs is the signal's symbol rate and N may be the pre-summation factor (FIG. 2, 14). Consequently, FFT bin resolution (i.e. the frequency difference between neighboring FFT coefficients) may equal to (Rs/N)/((L/N)*P)=Rs/(P*L). The pre-summation factor (N) may be determined at least in accordance with a ratio between a maximal frequency uncertainty (e.g. frequency offset or frequency error) a signal may be received at ($\Delta F$), and a symbol rate property of the received signal (Rs). In some embodiments, wherein said determining may be performed at least for the purpose of minimizing a degradation that may result from a pre-summation operation, the pre-summation factor (N) may be selected so that $\Delta F/Rs < 1/(4*N)$ (i.e. the ratio between the signal's symbol rate and the maximal frequency uncertainty at which the signal may be received may be higher than 4 times the pre-summation factor). Thus, as the symbol rate of a received signal may be higher, a higher pre-summation factor may be used. In some embodiments, said pre-summation factor may be used for adjusting an FFT vector size (FFT_size) to a desired size and/or for maintaining a constant maximal FFT processing rate over a range of input signals having a range of symbol rates. For example, assuming that for a minimal symbol rate that a receiver may be configured to receive ($Rs_{min}$) a maximal FFT vector size may be set as FFT_size=P*L (e.g. pre-summation might not be used in this case, i.e. N=1). Consequently, FFT module (16) may process a 2*L points' FFT (e.g. in case P=2) at a rate of $Na*Rs_{min}$. However, for a higher symbol rate, for example a symbol rate being twice the minimal symbol rate (i.e. $2*Rs_{min}$) and a zero-padding factor of P=2, the pre-summation factor may be set to N=2, resulting in FFT vector size of FFT_size=(L/N)*2=L. In other words, FFT module (16) may process L points' FFT at a rate of $2*Na*Rs_{min}$. Thus, using such determining of the pre-summation factor, an overall processing rate of FFT module (16) may be maintained, at least for the purpose of facilitating an implementation of such FFT module. In some embodiments, where fast acquisitions block (10) may be implemented using a Field Programmable Gate Array (FPGA), the blocks preceding FFT module (16) may be operated at Na*Rs clock rate, while the rest of the functions, including perhaps FFT module (16), may be operated using a faster clock, at least for the purpose of supporting a required processing rate for FFT calculations.

The complex output vectors of FFT module (16) may be presented at the input of absolute value calculation (ABS) block (17), for at least the purpose of obtaining a metric of magnitude (also referred to herein as FFT amplitude). ABS block (17) may be implemented in many ways. In some embodiments, the amplitude value of FFT results may be calculated, for example by using the following approximation:

$$|I+jQ| \approx MAX(ABS(I), ABS(Q)) + \tfrac{1}{2} MIN(ABS(I), ABS(Q))$$

In some embodiments, other metrics of magnitude (i.e. other than FFT amplitude value), which are monotonic, may be used. For example, such metrics of magnitude may include the absolute value of the amplitude, a square power of the amplitude, or any other monotonic function over amplitude.

In cases where the received signal may be of low signal to noise ratio (SNR), a single pass over all Na*UWFL time hypothesis may be insufficient for accurately determining a UW timing. Consequently, multiple FFT amplitude values, which may be calculated by ABS block (17) for multiple UW frames (i.e. consecutive values may refer to samples which may be UWFL symbols apart), may be averaged for at least the purpose of increasing the probability for correctly determining the UW timing. After a first UW frame, averaging of FFT amplitudes for all possible time and frequency indexes may be done using Infinite Impulse Response filter (IIR) (18). IIR filtering may be done by reading a previous IIR state from a memory (20), updating the IIR with the current FFT amplitude value (e.g. inp_data), and storing the result (H) back into memory (20). IIR filter (18) output values may be stored in memory (20), which may be configured to be of sufficient size for storing FFT_size*Na*UWFL values representing all time-frequency hypothesizes, wherein each value requires a single storage address. An address generation block (21) may be used for generating addresses for accessing memory (20), wherein each address may be composed of a least significant part representing a frequency index (FFT_ind) and a most significant part representing a timing index (Time_ind). A value stored in memory (20) during a previous iteration (prev_val) may be read and used together with a current FFT cell amplitude value (inp_data from ABS block (17)) for calculating a new IIR (18) value. The resulting IIR new value (next_val) may then be stored in memory (20) at the same address holding the IIR result value of the previous iteration (prev_val).

It should be noted that use of an IIR filter for averaging amplitude results is merely an example for such averaging. Other averaging methods may be used without leaving the scope of this disclosure, including for example any of summation, a sliding window, or use of Finite Impulse Response (FIR) filters.

FIG. 4 shows an example of memory (20) organization and addressing (40). A frequency search range (41) may be set in accordance with a maximal possible frequency uncertainty (e.g. offset or error) that may be expected ($\Delta F$). It may be noted that the FFT frequency range may be larger than the maximal possible frequency error, for example the FFT frequency range may be $\pm(Rs/(2*N))$ while only part of the FFT cells may be of interest. For example, where the expected maximal frequency uncertainty (e.g. offset or error) may be $\pm Rs/4$ and wherein N=1 (i.e. pre-summation may be bypassed), the number of FFT cells of interest may be only about half of the resulting FFT cell. Consequently, in the above example, the memory size of interest may be in the order of Na*UWFL*FFT size/2. In such embodiments, memory (20) may be reduced in size to hold only the cells of interest, wherein non-interesting results may be discarded.

Memory (20) may be visualized as a two-dimensional histogram of timing and frequency offset hypothesis, as shown in FIG. 4. In some embodiments, where fast acquisitions block (10) may be implemented in an FPGA, memory (20) may be a single dimension vector and said two-dimensional view may be obtained through having a frequency index (42) (FFT_ind), which may be used for driving the least significant bits (LSB) of the address, and a timing index (43) (Time_ind), which may be used for driving the most significant bits (MSB) of the address. It may be noted that in the worst case (i.e. wherein memory (20) may be configured to hold all the FFT results of FFT module (16)), the address may include $LOG_2$(Na*UWFL*FFT_size) bits, denoting the time-frequency cell address (for instance, the least significant address bits may be used for FFT bin index, while most significant address bits may denote the half-symbol location of the FFT input vector within samples counter (23) range).

Again in reference to FIG. 2, in some embodiments IIR memory (20) may be initially filled with zeroes (0). The IIR filter (18) output, H(n), may be calculated from input X(n) using the equation:

$$H(n)=K*X(n)+(1-K)*H(n-1); K<<1$$

wherein K (33) may be a leakage factor value defining an averaging length (for example, it may be significantly lower than 1). In some embodiments, the leakage factor (K) may be set in accordance with a number of iterations that may be sufficient for obtaining a reliable acquisition decision, wherein 1/K may approximately be the said number of iterations.

In parallel to updating IIR memory (20), the memory location of a maximal amplitude level may be tracked. After a sufficient number of iterations, an index to the maximal amplitude level within memory (20) may indicate the frequency offset and the UW Frame timing index for the received signal.

Again in reference to FIG. 2, in order to estimate a cell holding a value representing maximal power, calculation results from IIR (18) may be streamed to max search block (19), which may be configured to provide an index to a maximal value (referred to herein as max index), corresponding to a chosen time-frequency hypothesis. The least significant portion of said max index may be used for frequency error estimation (Frequency Estimation block (24)), while the most significant portion of said max index may be used as frame start time estimation (Time_est (31)) and possibly applied to samples counter (23) for at least the purpose of synchronizing samples counter (23) with the frame timing.

The averaging factor (e.g. dictated by K in the IIR equation) may be configurable. In some embodiments, the averaging factor may be selected in accordance with specific SNR conditions. Maximum peak searching may be performed "on the fly", i.e. with each new index of IIR memory (20) being updated. Maximum search block (19) may be configured to provide any of the following on its outputs: a maximum peak value (max_value), a maximum peak time (Time_est) and a frequency index (FFT_ind).

A lock detection decision (FIG. 2, 25) may be conditioned to the maximum averaged amplitude value determined by max search (19) being higher than a threshold (32) (i.e. MAX (H)>Thr). Referring to FIG. 1, in some embodiments an automatic gain control block, AGC (8), may be included in the demodulation chain, at least for the purpose of regulating a power level property of the received signal at the input to fast acquisition module (10) and/or allowing reliable lock detection using threshold (32) independently of the power level of the received signal at the input of the demodulation path.

In some embodiments, frequency error and frame timing estimates may become valid immediately after lock detection may be provided by lock detection block (25). The threshold value (32) (Thr) may be either predefined or configurable, and it may depend on any of a required acquisition detection probability, a false detection probability and said IIR leakage factor (33). In some embodiments, determining termination of the acquisition process (e.g. lock detection) may be based on using a first maximum and a second maximum peak ratio compared to a threshold, wherein said second maximum peak might not be associated with a nearest neighbor in either time or frequency to said first maximum peak.

In some embodiments, wherein the processed signal may be a burst signal, a transmission may include a single frame having a single UW. In such embodiments, the UW timing within an uncertainty time window may be determined in parallel to determining a frequency offset at which the burst may be received. In addition, burst reception may not allow averaging of a metric of magnitude as previously described, as the UW may appear only once. Thus, burst timing and frequency offset may be determined by a maximal value of a metric of magnitude in the two-dimensional time-frequency map corresponding to a time-frequency search window.

In some embodiments, the methods described above may be used in a satellite communication system. A receiver configured to receive a signal from a satellite may be configured to use one or more of the methods described above at least for the purpose of acquiring frame timing (e.g. of a UW located within a frame) of a received signal wherein the signal may be received with frequency uncertainty.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claim is:

1. A method including:
    receiving a signal comprising a framing property marked by a unique word (UW) comprising a predefined sequence of symbols;
    producing a digitally sampled signal corresponding to the received signal, the digitally sampled signal having a sampling rate of Na*Rs, wherein Rs is a symbol rate of the received signal and Na is a number of samples per symbol;
    determining a frequency offset associated with the received signal and a location of the unique word within a frame of the received signal, wherein the determining is based on a two-dimensional search and wherein the determining comprises:
        eliminating a unique word modulation from the digitally sampled signal to produce a plurality of vectors each having L un-modulated samples at intervals of 1/Rs, wherein L is a length, in symbols, of the unique word;
        counting the plurality of vectors using a first counter and associating each of the plurality of vectors with a time index corresponding to a count value of the first counter;
        summing groups of N adjacent samples within each of the plurality of vectors to produce decimated vectors of L/N samples, wherein N is a positive integer;
        padding the decimated vectors with time-domain zeroes to produce padded vectors of P*(L/N) samples, wherein P≥1;
        performing a Fourier Transform (FT) on the padded vectors to produce transformed vectors;
        counting FT samples of the transformed vectors using a second counter and associating each of the FT samples with a frequency index corresponding to a count value of the second counter;
        calculating at least one metric of magnitude for at least one sample in the transformed vectors; and
        storing the at least one metric of magnitude at a storage address in a memory, wherein the storage address is determined in accordance with the time index and the frequency index associated with the at least one sample corresponding to the at least one metric of magnitude.

2. The method of claim 1, wherein producing the digitally sampled signal comprise:
    demodulating the received signal to produce a complex baseband signal;
    converting the complex baseband signal to a digitally sampled complex signal;
    filtering the digitally sampled complex signal using a matched filter to produce a matched filter output signal; and
    decimating the matched filter output signal to produce the digitally sampled signal having the sampling rate of Na*Rs.

3. The method of claim 1, wherein calculating the at least one metric of magnitude comprises averaging results that are UWFL symbols apart, wherein UWFL is a distance, in symbols, between adjacent instances of the unique word.

4. The method of claim 3, wherein the averaging is performed through filtering the at least one metric of magnitude using an Infinite Impulse Response (IIR) filter and wherein the filtering comprises:
    reading a previously stored value (H(n−1)) from the storage address of the memory;
    calculating an IIR filter output value (H(n)) in accordance with the following expression: H(n)=K*X(n)+(1−K)*H(n−1), wherein K is a leakage factor value and X(n) corresponds to a value of a sample presented at an input of the IIR filter; and
    storing the calculated IIR filter output value (H(n)) in the memory at the storage address.

5. The method of claim 1, further comprising determining of the storage address in accordance with the time index and the frequency index by using the frequency index to form a first portion of bits of the storage address and using the time index to form a second portion of bits of the storage address.

6. The method of claim 1, further comprising setting N equal to 1 to reduce effects of the summing of the groups of N adjacent samples.

7. The method of claim 1, further comprising determining N in accordance with a ratio between a maximal frequency uncertainty (ΔF) and the symbol rate (Rs) of the received signal.

8. The method of claim 1, further comprising:
providing values (H) stored in memory for a maximum search in parallel to storing the values in the memory;
determining a maximal value (MAX(H)) of the provided values;
comparing the maximum value with a threshold (Thr); and
determining a lock on the received signal if the maximum value is greater than the threshold (MAX(H)>Thr).

9. The method of claim 1, further comprising determining a lock on the received signal by:
determining a first maximum value from a plurality of values stored in the memory, the first maximum value corresponding to a first time index and a first frequency index;
determining a second maximum value from the plurality of values stored in the memory, the second maximum value corresponding to a second time index and a second frequency index, wherein the second time index is not a nearest neighbor of the first time index and the second frequency index is not a nearest neighbor of the first frequency index;
calculating a ratio between the first maximum value and the second maximum value;
comparing the calculated ratio to a threshold; and
determining the lock on the signal if the ratio exceeds the threshold.

10. The method of claim 8, further comprising:
determining a maximum index corresponding to the determined maximal value when lock is determined;
determining a frequency offset of the received signal using a first portion of the maximum index; and
determining a frame start time estimation using a second portion of the maximum index.

11. The method of claim 10, further comprising using the frame start time estimation for synchronizing the first counter with frame timing.

12. A system, comprising:
memory; and
a receiver coupled to the memory, the receiver configured to:
receive a signal comprising a framing property marked by a unique word (UW) comprising a predefined sequence of symbols;
produce a digitally sampled signal corresponding to the received signal, the digitally sampled signal having a sampling rate of Na*Rs, wherein Rs is a symbol rate of the received signal and Na is a number of samples per symbol;
determine a frequency offset associated with the received signal and a location of the unique word within a frame of the received signal, wherein the determining is based on a two-dimensional search and wherein the determining comprises:
eliminating a unique word modulation from the digitally sampled signal to produce a plurality of vectors each having L un-modulated samples at intervals of 1/Rs, wherein L is a length, in symbols, of the unique word;
counting the plurality of vectors using a first counter and associating each of the plurality of vectors with a time index corresponding to a count value of the first counter;
summing groups of N adjacent samples within each of the plurality of vectors to produce decimated vectors of L/N samples, wherein N is a positive integer;
padding the decimated vectors with time-domain zeroes to produce padded vectors of P*(L/N) samples, wherein P≥1;
performing a Fourier Transform (FT) on the padded vectors to produce transformed vectors;
counting FT samples of the transformed vectors using a second counter and associating each of the FT samples with a frequency index corresponding to a count value of the second counter;
calculating at least one metric of magnitude for at least one sample in the transformed vectors; and
storing the at least one metric of magnitude at a storage address in the memory, wherein the storage address is determined in accordance with the time index and the frequency index associated with the at least one sample corresponding to the at least one metric of magnitude.

13. The system of claim 12, wherein the receiver comprises:
a demodulator configured for demodulating the received signal and producing a complex baseband signal;
an analog to digital converter configured for converting the complex baseband signal to a digitally sampled complex signal at a sampling rate of $f_s$;
a re-sampler configured for resampling the digitally sampled complex signal at a sampling rate of Ns*Rs to produce a resampled complex signal, wherein Ns is a number of samples per symbol;
a matched filter configured for filtering the resampled complex signal to produce a matched filter output signal; and
a decimator configured for decimating the matched filter output signal to produce the digitally sampled signal having the sampling rate of Na*Rs.

14. The system of claim 13,
wherein the re-sampler, the matched filter, and the decimator are implemented using one or more Field Programmable Gate Array (FPGA) devices, and
wherein the one or more FPGA devices are used for determining the frequency offset associated with the received signal and the location of the unique word within the frame of the received signal.

15. The system of claim 12, wherein the receiver comprises:
an Infinite Impulse Response (IIR) filter configured for averaging metric of magnitude values using a leakage factor,
wherein the receiver is further configured to store the averaged metric of magnitude values in the memory, wherein a storage address for each value of the averaged metric of magnitude values is determined in accordance with a time index and a frequency index associated with a sample corresponding to the value.

16. The system of claim 12, wherein the receiver is further configured to perform averaging of metric of magnitude values by:
reading a previously stored value (H(n−1)) from the storage address of the memory;
calculating an output value (H(n)) in accordance with the following expression: H(n)=K*X(n)+(1−K)*H(n−1), wherein K is a leakage factor value and X(n) corresponds to a value of a sample presented at an input of an Infinite Impulse Response (IIR) filter; and
storing the calculated output value (H(n)) in the memory at the storage address.

17. The system of claim 12, wherein the receiver is further configured to:
- determine a maximal value (MAX(H)) of averaged metric of magnitude values;
- compare a the maximum value (MAX(H)) with a threshold (Thr); and
- determine a lock on the received signal if the maximum value is greater than the threshold (MAX(H)>Thr).

18. The system of claim 12, wherein the receiver is configured to receive signals transmitted from a satellite.

19. A receiver, comprising:
- a means for receiving a signal comprising a framing property marked by a unique word (UW) comprising a predefined sequence of symbols;
- a means for producing a digitally sampled signal corresponding to the received signal, the digitally sampled signal having a sampling rate of Na*Rs, wherein Rs is a symbol rate of the received signal and Na is a number of samples per symbol; and
- a means for determining a frequency offset associated with the received signal and a location of the unique word within a frame of the received signal, wherein the determining is based on a two-dimensional search and wherein the determining comprises:
  - eliminating a unique word modulation from the digitally sampled signal to produce a plurality of vectors each having L un-modulated samples at intervals of 1/Rs, wherein L is a length, in symbols, of the unique word;
  - counting the plurality of vectors using a first counter and associating each of the plurality of vectors with a time index corresponding to a count value of the first counter;
  - summing groups of N adjacent samples within each of the plurality of vectors to produce decimated vectors of L/N samples, wherein N is a positive integer;
  - padding the decimated vectors with time-domain zeroes to produce padded vectors of P*(L/N) samples, wherein P≥1;
  - performing a Fourier Transform (FT) on the padded vectors to produce transformed vectors;
  - counting FT samples of the transformed vectors using a second counter and associating each of the FT samples with a frequency index corresponding to a count value of the second counter;
  - calculating at least one metric of magnitude for at least one sample in the transformed vectors; and
  - storing the at least one metric of magnitude at a storage address in a memory, wherein the storage address is determined in accordance with the time index and the frequency index associated with the at least one sample corresponding to the at least one metric of magnitude.

20. The receiver of claim 19, wherein the means for receiving the signal comprises a demodulator configured for demodulating the received signal and producing a complex baseband signal.

21. The receiver of claim 19, wherein the means for producing the digitally sampled signal comprises an analog to digital converter configured for converting a complex baseband signal to a digitally sampled complex signal at a sampling rate of $f_s$.

22. The receiver of claim 21, wherein the means for producing the digitally sampled signal further comprises a re-sampler configured for resampling the digitally sampled complex signal at a sampling rate of Ns*Rs to produce a resampled complex signal, wherein Ns is a number of samples per symbol.

23. The receiver of claim 19, wherein the means for determining the frequency offset associated with the received signal and the location of the unique word within the frame of the received signal comprises one or more Field Programmable Gate Array (FPGA) devices.

* * * * *

UNITED STATES PATENT AND TRADEMARK OFFICE
CERTIFICATE OF CORRECTION

PATENT NO. : 8,804,878 B2
APPLICATION NO. : 13/668788
DATED : August 12, 2014
INVENTOR(S) : Uzi Ram et al.

It is certified that error appears in the above-identified patent and that said Letters Patent is hereby corrected as shown below:

In the Claims

Column 10, Claim 2, Line 31:
In Claim 2, please delete "comprise:" and insert --comprises:--

Column 13, Claim 17, Line 5:
In Claim 17, after "compare", delete "a"

Signed and Sealed this
Seventh Day of April, 2015

Michelle K. Lee
*Director of the United States Patent and Trademark Office*